United States Patent
Dandamudi et al.

(10) Patent No.: US 10,372,216 B2
(45) Date of Patent: Aug. 6, 2019

(54) GESTURE FEEDBACK

(71) Applicant: NXP B.V., Eindhoven (NL)

(72) Inventors: Srikanth Dandamudi, Bangalore (IN); Harish Dixit, Bangalore (IN)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 15/449,735

(22) Filed: Mar. 3, 2017

(65) Prior Publication Data

US 2017/0255265 A1    Sep. 7, 2017

(30) Foreign Application Priority Data

Mar. 4, 2016    (EP) ..................... 16158668

(51) Int. Cl.
| | | |
|---|---|---|
| *G06F 3/01* | (2006.01) | |
| *G06F 1/16* | (2006.01) | |
| *H04B 5/00* | (2006.01) | |
| *G06F 3/046* | (2006.01) | |
| *H04W 4/80* | (2018.01) | |
| *H04W 4/21* | (2018.01) | |

(52) U.S. Cl.
CPC .............. *G06F 3/016* (2013.01); *G06F 1/163* (2013.01); *G06F 3/014* (2013.01); *G06F 3/017* (2013.01); *G06F 3/046* (2013.01); *H04B 5/0031* (2013.01); *H04W 4/80* (2018.02); *G06F 2203/0331* (2013.01); *H04W 4/21* (2018.02)

(58) Field of Classification Search
CPC .. G06F 1/163; G06F 2203/0331; G06F 3/014; G06F 3/016; G06F 3/017; H04B 5/0031; H04W 4/008; H04W 88/06

USPC .......................................................... 345/156
See application file for complete search history.

(56) References Cited

U.S. PATENT DOCUMENTS

| | | |
|---|---|---|
| 8,279,091 B1 | 10/2012 | Tran et al. |
| 2009/0027202 A1 | 1/2009 | Copeland et al. |
| 2011/0181509 A1 | 7/2011 | Rautiainen et al. |
| 2012/0139708 A1 | 6/2012 | Paradiso et al. |
| 2012/0293404 A1 | 11/2012 | Federico et al. |
| 2013/0127736 A1 | 5/2013 | Judson et al. |

(Continued)

FOREIGN PATENT DOCUMENTS

| | | |
|---|---|---|
| EP | 2 851 775 A1 | 3/2015 |
| WO | WO2011/055326 A1 | 5/2011 |
| WO | WO2014/169036 A1 | 10/2014 |

OTHER PUBLICATIONS

Extended European Search Report for Patent Appln. No. 16158668.0 (dated Aug. 19, 2016).

(Continued)

*Primary Examiner* — Tony O Davis

(57) ABSTRACT

A gesture recognition device (100) for recognising gestures made by a user is disclosed. The device comprises a gesture detector for detecting a gesture made be a user and a gesture analysis block, the gesture analysis block comprising a memory configured to store known gestures, and a pattern recognition block configured to associate a gesture detected by the gesture detector with a known gesture stored in the memory. The device (100) further comprises a magnetic field generator for interacting with a wearable tag (200), the magnetic field generator configured to provide a magnetic force (202) on the wearable tag (200) when a particular gesture is recognised by the gesture analysis block.

11 Claims, 4 Drawing Sheets

(56) References Cited

U.S. PATENT DOCUMENTS

| | | | |
|---|---|---|---|
| 2013/0135223 A1 | 5/2013 | Shai | |
| 2013/0309964 A1 | 11/2013 | Hall et al. | |
| 2014/0035812 A1* | 2/2014 | Skurnik | G06F 3/017 345/156 |
| 2014/0101755 A1 | 4/2014 | Tang | |
| 2014/0240277 A1 | 8/2014 | Yoo et al. | |
| 2015/0105021 A1 | 4/2015 | Schroeder | |
| 2015/0175172 A1 | 6/2015 | Troung | |
| 2016/0044394 A1 | 2/2016 | Derom | |
| 2016/0175711 A1* | 6/2016 | Billington | G06F 3/016 463/38 |
| 2016/0195928 A1* | 7/2016 | Wagner | G06F 3/016 345/156 |

OTHER PUBLICATIONS

"Facebook close its $2bn Oculus Rift acquisition. What next?", The Guardian, 5 pgs, retreived from the internet archive at: http://web.archive.org/web/20150627215139/http://www.theguardian.com/technology/2014/jul/22/facebook-oculus-rift-acquisition-virtual-reality (Jul. 22, 2014).

"Google Cardboard", Google, 5 pgs, retreived from the Internet archive at: http://web.archive.org/web/20150630105124/https://www.google.com/get/cardboard/ (Jun. 30, 2015).

"Google for Education—Expeditions", Google, 3 pgs, retreived from the internet archive at: http://web.archive.org/web/20150618022135/https://www.google.com/edu/expeditions/ (Jun. 18, 2015).

"Rapid Growth Forecasted for the Head Mounted Display Market", Market Research World, 2 pgs, retreived from the internet at: http://web.archive.org/web/20140720122016/http://www.marketresearchworld.net/content/view/5786/76/ (Jul. 20, 2014).

"Head Mounted Display (HMD) Market by Products (Helmet Mounted, Wearable Glass), Components (Mirco display, Camera, control unit, Tracker, Accessories), Applications (Defense, industrial, Video Gaming) & Geography—Global Analysis and Forecase to 2020", Markets and Markets, 7 pgs, retreived from the internet archive at: http://web.archive.org/web/20140630004235/http://www.marketsandmarkets.com/Market-Reports/head-mounted-display-hmd-market-720.html (May 2014).

Tamaki, E. et al. "Gesturenail: Wireless Hand Gesture System", International Journal of Computer Science, Engineering and Applications, vol. 3, No. 5, 10 pgs (Oct. 2013).

* cited by examiner

GESTURE FEEDBACK

CROSS-REFERENCE TO RELATED APPLICATONS

This application claims the priority under 35 U.S.C. § 119 of European patent application No. 16158668.0, filed on Mar. 4, 2016, the contents of which are incorporated by reference herein.

FIELD

The disclosure relates to gesture recognition, and in particular to a gesture recognition device for providing sensory feedback in response to a gesture.

BACKGROUND

Many electronic devices require users to perform specific gestures to interact with the device, for example swiping across the screen of a smart phone to unlock the device. These devices typically require the user to physically touch the device for the gesture to be recognised. This is not always desirable. For virtual reality devices, for example, having to interact with the device by physically touching a touchscreen may limit the virtual reality experience and/or be impractical (for example if a touchscreen is positioned close to a user's eyes).

Moreover, devices typically do not provide any kind of sensory feedback to indicate that a gesture has been performed. This can also limit a virtual reality experience, as well as limiting interactivity with more conventional smart phone and other screen-based applications.

SUMMARY

In accordance with a first aspect of the present disclosure, there is provided a gesture recognition device for recognising gestures made by a user, the device comprising:
   a gesture detector for detecting a gesture made be a user;
   a gesture analysis block comprising:
   a memory configured to store known gestures; and
   a pattern recognition block configured to associate a gesture detected by the gesture detector with a known gesture stored in the memory; and
   a magnetic field generator for interacting with a wearable tag, the magnetic field generator configured to provide a magnetic force on the wearable tag when a particular gesture is recognised by the gesture analysis block.

A user may wear the wearable tag, for example on or around a fingernail or fingertip, when using the device. If the device recognises a particular gesture, for example pressing a virtual switch, then a magnetic force is applied to the tag, for example producing a force that mimics the feel of pressing a real switch. The force on the tag may be attractive or repulsive. The magnetic field generator may comprise a plurality of generators, each generator independently operable to provide a magnetic force on the tag. The generators may be spatially separated. Thus the device may provide an attractive force on the tag from some generators, and simultaneously a repulsive force on the tag from other generators.

In some example embodiments, the gesture detector may comprise an antenna for transmitting and detecting electromagnetic radiation, wherein the gesture detector is operable to detect electromagnetic radiation reflected from a user. The reflections may be used to detect a gesture made by the user, without the user having to physically touch the device.

In some example embodiments the gesture detector comprises an array of antennae for transmitting and detecting electromagnetic radiation.

In some example embodiments, the antenna or antennae are operable to transmit and receive radio waves in a near field regime. The device may further comprise a near field communication (NFC) reader configured to transmit and receive NFC signals using the antenna or at least one of the antennae. The NFC reader may, for example, be used to communicate with the wearable tag. For example, the NFC reader may receive information about the wearable tag or the user, such as confirmation that the user has permission to access the device.

In some embodiments, the gesture detector may comprise a digital camera. The camera may be used to record gestures made by the user, which can then be analysed by the gesture analysis block. This also permits the user to make a gesture without physically touching the device.

In some example embodiments, the magnetic field generator may comprise a permanent magnet. Alternatively, the magnetic field generator may be configured to apply a DC current to the antenna or to at least one of the antennae in order to generate a magnetic field.

In some example embodiments the device may be operable to separate transmission of electromagnetic radiation from generation of the magnetic field using time-domain multiplexing or field switching. This may avoid interference between the magnetic and electromagnetic fields.

According to a second aspect there is provided a gesture recognition system comprising a wearable tag suitable to be worn by a user of the system, and a gesture recognition device according to any example embodiment of the first aspect.

In some example embodiments of the second aspect, the wearable tag may comprise a permanent magnet. In such embodiments, the gesture recognition device may comprise an electromagnet, to switchably produce a magnetic field to interact with the permanent magnet of the wearable tag. For example, the magnetic field generator of the device may be configured to apply a DC current to an antenna or to at least one of a plurality of antennae in order to generate a magnetic field.

In alternative example embodiments, the wearable tag may comprise an electromagnet, and the system may further comprise a power source operable to power the electromagnet. In such embodiments, the magnetic field generator of the gesture recognition device may be a permanent magnet.

In some example embodiments, the wearable tag may comprise an antenna and a microprocessor configured to communicate with the gesture recognition device using NFC signals.

According to a third aspect there is provided a method of providing a sensory feedback to a user of a gesture recognition device, the method comprising:
   detecting a gesture made by a user with a gesture detector of the device;
   recognising the gesture by associating the detected gesture with known gestures using a gesture analysis block of the device;
   generating a magnetic field with a magnetic field generator of the device in response to recognising a particular gesture, in order to provide a magnetic force on a wearable magnetic tag worn by the user.

In some example embodiments, the step of detecting a gesture made by the user may comprise transmitting electromagnetic radiation from an antenna of the device, and detecting electromagnetic radiation that is reflected from the user. In such embodiments, the steps of transmitting electromagnetic radiation and generating the magnetic field may be separated using time domain multiplexing or field switching techniques.

These and other aspects of the invention will be apparent from, and elucidated with reference to, the embodiments described hereinafter.

BRIEF DESCRIPTION OF DRAWINGS

Embodiments will be described, by way of example only, with reference to the drawings, in which.

Figure 1:
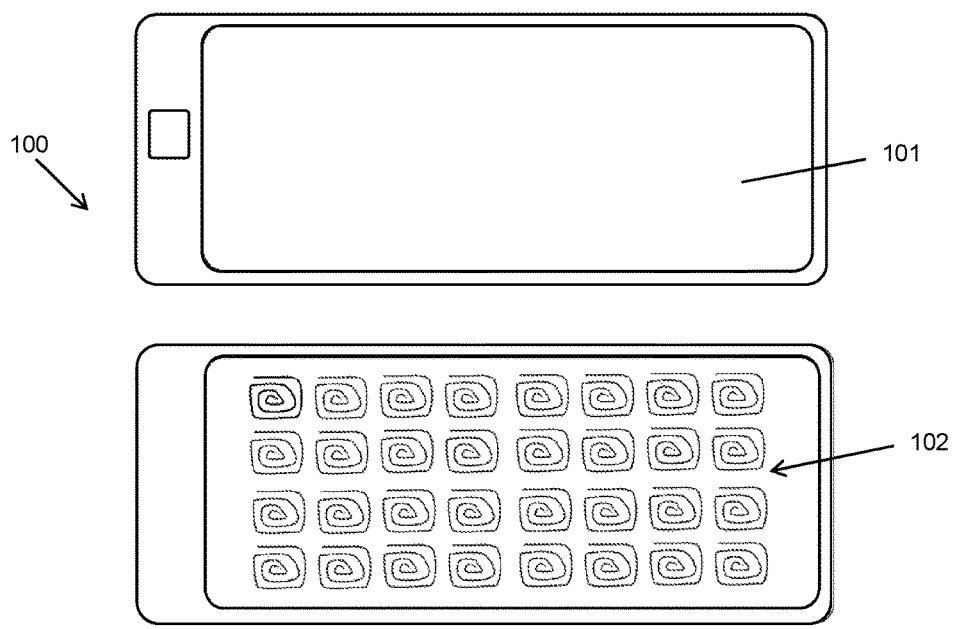
FIG. 1 is a schematic representation of an example gesture recognition device.

It should be noted that the Figures are diagrammatic and not drawn to scale. Relative dimensions and proportions of parts of these Figures have been shown exaggerated or reduced in size, for the sake of clarity and convenience in the drawings. The same reference signs are generally used to refer to corresponding or similar feature in modified and different embodiments.

DETAILED DESCRIPTION OF EMBODIMENTS

FIG. 1 shows an example gesture recognition device 100. The top part of FIG. 1 illustrates the front face of the device 100. The device 100 may, for example, be a smart phone, or any other device capable of detecting and recognising gestures made by a user. In the illustrated example, device 100 comprises a screen 101 which may be a touchscreen, such as the touchscreen of a conventional smart phone.

The bottom part of FIG. 1 illustrates a view of the interior of device 100. Device 100 comprises an array of antennae 102, which may as illustrated be arranged as a rectangular array. Array 102 may for example be an array of near field communications (NFC) antennae, capable of transmitting and receiving electromagnetic waves, and particularly radio waves, in the near field regime. The antennae of array 102 may be operable to perform multiple functions. For example, they may function as the antenna of a normal NFC reader, capable of communicating with NFC tags. The antennae of array 102 may also be used as part of a gesture detector of the device 100, the array 102 providing an NFC electromagnetic field for gesture detection. For example, the antenna may emit an NFC field. Electromagnetic waves may reflect from a user performing a gesture within the field, for example above the device 100. The reflected waves may be detected by the antenna of array 102, and analysed to detect known gestures.

Additionally, the antennae of array 102 may be used as part of a magnetic field generator. A DC current may be provided to one or more antennae of the array 102, or a DC offset to an alternating current may be provided to one or more of the antennae of the array 102. A DC current flowing through an antenna will induce a magnetic field.

A magnetic field may be generated by one or more of the antennae of array 102 when a particular gesture is recognised by device 100. This field may provide a magnetic force on a tag worn by the user making the gesture in order to provide sensory feedback in response to the gesture. The magnetic field may be induced so as to create an attractive or a repulsive force on such a tag. Multiple antennae may be used to induce a magnetic field. As the antennae of array 102 are spread spatially across the device, using multiple antennae may provide a position dependent magnetic field. Some of the antennae may be used to generate an attractive force, whilst other antennae simultaneously generate a repulsive force on the wearable tag. The force feedback may be dependent upon the location of the gesture and/or the position of the tag on the user's individual fingers.

Figure 2A:
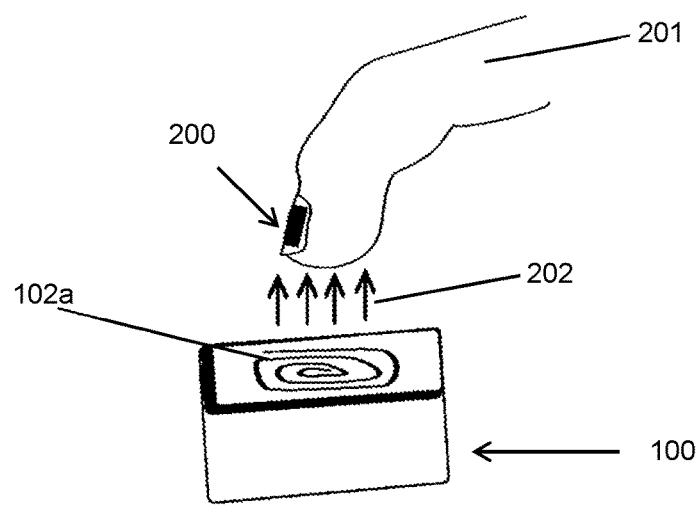
FIGS. 2A and 2B illustrate an example of a use of the device shown in FIG. 1.

FIG. 2A illustrates an example of a user interacting with device 100. The user wears a wearable tag 200, for example on a fingernail of a finger 201 of the user. The user may wear one or more tags 200. For example, the user may wear tags 200 on one or more fingernails. In the illustrated example, tag 200 comprises a permanent magnet for interacting with the temporary magnetic field generated by device 100. However, tag 200 may alternatively comprise an electromagnet, connected to a power supply.

Figure 2B:
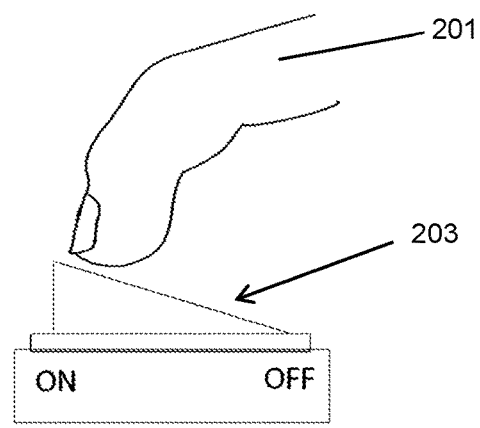

The user may perform a gesture to interact with the device. In the illustrated example, the user makes a gesture to simulate pressing a virtual switch, for example a switch displayed on screen 101 of the device 100. When the device 100 recognises this gesture, a DC current is applied to one of the antennae, antenna 102a, in order to generate a magnetic field. The induced magnetic field applies a magnetic force 202 to the tag 200. In the illustrated example force 202 is a repulsive force. The force applied to the tag 200 is felt by the user; in the illustrated example the user feels a force pushing their finger 201 away from the device 100. In the present example, this force may feel equivalent to the resistance felt when pressing a physical switch, such as switch 203 illustrated in FIG. 2B.

Figure 3:
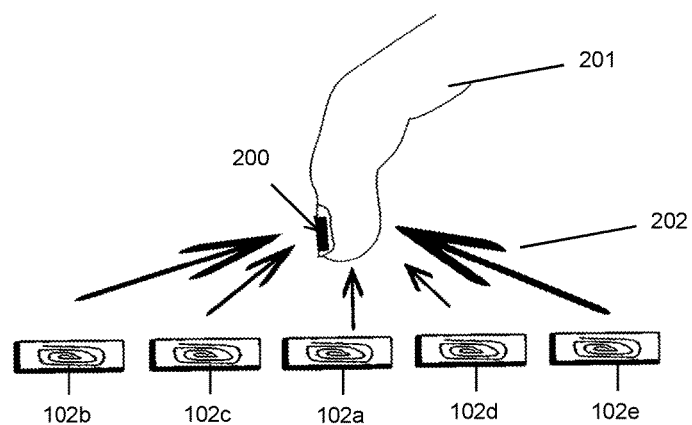
FIG. 3 illustrates an alternative example of a use of the device shown in FIG. 1.

FIG. 3 illustrates an alternative example, where a force is applied on tag 200 in response to a gesture not just from the antenna 102a directly below the tag 200, but also from neighbouring antennae 102b-e. In the illustrated embodiment, all active antennae 103a-c provide a force in the same direction, pushing tag 200 away from the device 100. In alternative examples, all of antennae 102a-e may provide an attractive force, or antennae 102a-e may each provide a force in a different direction and/or with a different strength.

The examples illustrated in FIGS. 2 and 3 are only a simple examples of gestures and feedback that can be detected and produced by device 100. In other examples, the force feedback may be dependent upon the location of the gesture, and/or on the position of one or more tags 200 worn by the user. In other examples, the induced field may be controlled so that the dynamics of the force can be altered, for example by controlling the strength of the induced field as a function of time, or of position of the one or more tags 200. In the latter case, for example, the strength of the magnetic field can be controlled as a function of position by varying which antennae of array 102 induce a magnetic field, and how much DC current flows through such antennae. The direction of the current through an antenna may be reversed to reverse the direction of the generated force 202. If more than one tag 200 is worn by the user, the array 102 may be configured so that each tag 200 feels a different force depending on its position relative to the array 102, and on the particular gesture being performed.

In other examples, a magnetic force may be generated to prompt a gesture by the user, for example an activity on the screen may trigger a force to be generated. As an example, virtual switches may only become available after completion of a task. A force can be provided on the user to indicate that the virtual switches are now available. As an alternative example, multiple antennae may be used to produce a magnetic field that pushes and/or pulls the tag 200 in a particular direction in response to activity on the screen. For example, a tilt in the plane in a simulation game may lead to generation of a magnetic field that pushes and/or pulls the tag 200 in the direction of the tilt.

Tag 200 may comprise an NFC tag as well as a magnet. The NFC tag may comprise an NFC microchip and antenna, capable of transmitting and receiving NFC signals. The NFC tag may for example store information about the tag, or about the user, in a memory. The NFC tag may be operable to communicate with the NFC reader of device 100. The NFC tag may for example inform the device 100 of which of the user's fingers it is attached to, to help device 100 recognise a particular gesture. The NFC tag may communicate information about the amount of force that must be generated by the device 100 to create a suitable force on the tag 200. The NFC tag may provide security information to device 100, for example confirming that the user has permission to operate device 100.

Figure 4:
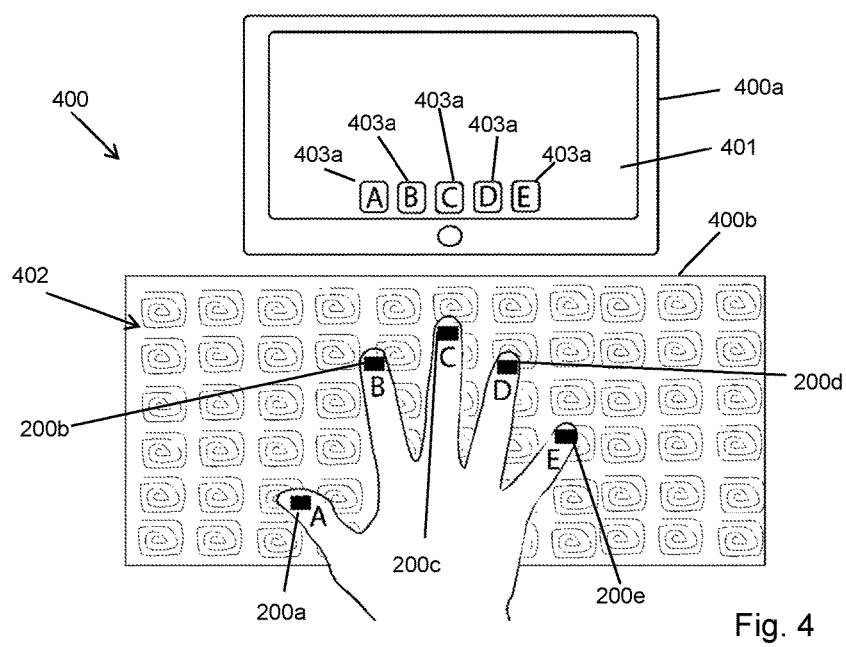
FIG. 4 is a schematic representation of an alternative example of a gesture recognition device.

FIG. 4 illustrates an alternative example of a gesture recognition device 400. Device 400 comprises a primary device 400a in communication with a platform controller 400b. The platform controller 400b comprises an array of antennae 402. The antennae 402 may operate in any manner described above in relation to the antennae of array 102. Primary device 400a may be any electronic device, for example a smart phone or a virtual reality headset. In the illustrated example, primary device 400a comprises a screen 401. Primary device 400a may communicate with the platform controller 400b using any method, for example either wired or wireless communications.

In the illustrated example, a user wears five magnetic tags 200a-e, one on each finger and thumb of one hand, to interact with platform controller 400b. In alternative examples, the user may use both hands, for example with tags on every finger of both hands. In alternative examples, two or more different users, each wearing one or more tags 200 may interact with the device 400.

Each tag 200a-e may comprise a permanent magnet or an electromagnet, in addition to an NFC tag. The NFC tag of each tag 200 may for example communicate with one or more NFC readers in the platform controller 400b, for example to provide information about which finger the tag 200 is attached to.

As an example of operation, each tag 200a-e may be linked to a corresponding function 403a-e of the primary device 400a. A particular operation of a function 403a-e may direct the platform controller 400b to generate a particular magnetic force on a particular tag 200a-e. For example, function 403a may instruct the platform controller to apply a force to tag 200a, but not to any other tags. One or more antennae in the vicinity of tag 200a may be used to generate a magnetic force on the tag 200a, but antennae near the other tags 200b-e may be left off so that these tags do not feel a force.

In an example of a reverse operation, the array 402 of platform controller 400b may be used to detect the force at which a user imitates a gesture, for example imitating pressing a key on a keyboard. The magnetic field of a tag 200a-e may induce a current in one or more antennae in array 402 during the gesture. The generated current may be used to determine a measure of the force at which the gesture was made. For example, in the case where each tag 200a-e is linked to a corresponding function 403a-e, the corresponding function 403a-e may only run if the correct tag 200a-e performs a particular gesture with sufficient force. Alternatively, difference functions may be run on primary device 400a depending upon the force with which a gesture is made. Such reverse operation may also be used with the examples of device 100 described above.

Figure 5:
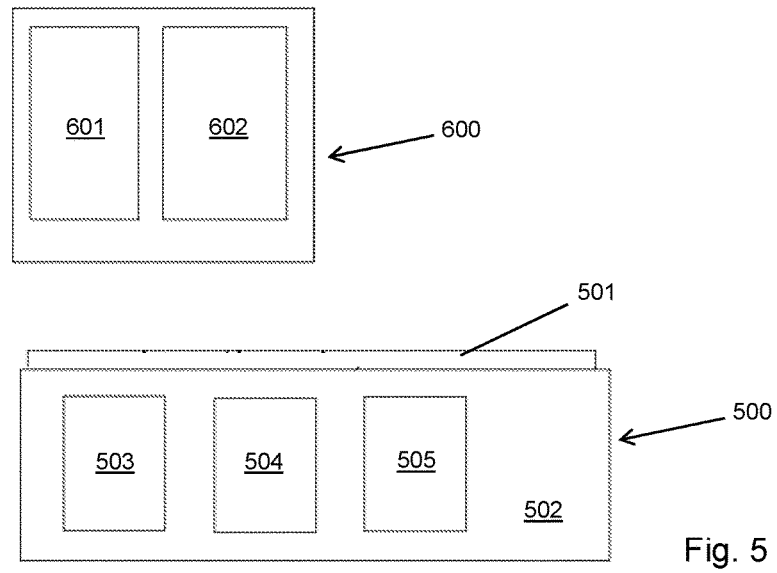
FIG. 5 illustrates block diagrams of the components of the gesture recognition device and the wearable tag.

FIG. 5 represents a block diagram of the systems that may operate a gesture recognition device and tag, such as devices 100 and 400, and tag 200.

Gesture recognition device 500 comprises an antenna or array of antennae in communication with a platform controller 502. Platform controller 502 comprises a gesture analysis block 503, a magnetic force control block 504 and an NFC reader 505, each in communication with each other under the control of the platform controller 502.

Wearable tag 600 comprises a permanent magnet or an electromagnet 601 in addition to an NFC block 602. NFC block 602 may be configured to communicate identification and/or security information to the NFC reader 505 of the device 500. Optionally, NFC block 602 may also send information about what field strength the device 500 should use to apply a force to the tag 600.

A gesture can be detected by the antenna or array 501, for example by detecting reflection of NFC signals from a user, or from a tag or tags 600 worn by a user, or by detecting NFC signals transmitted by a tag or tags 600 worn by a user.

The detected gesture may be analysed by the gesture analysis block 503. The gesture analysis block 503 is at its base level a pattern recognition block which has the capacity to store a set of field variations, sampled at a particular frequency and digitized as a 'gesture'. This database is then used for referencing in the operating mode.

The analysed gesture can be sent to the platform controller 502 and aggregated with corresponding Identification and, optionally, security information received from the NFC reader block 505 along with the optional information on the magnetic force setting desired by the individual tags 600.

This information can then be fed to the magnetic force control block 504 to configure the array in order to generate a force on tag or tags 600. Alternatively or additionally, the force requirement of the tag can be independently determined by the NFC reader 505 or can be configured by an app. The platform controller 502 can be made part of any electronic device so as to make the device gesture compliant and responsive to magnetic force feedback.

Figure 6:
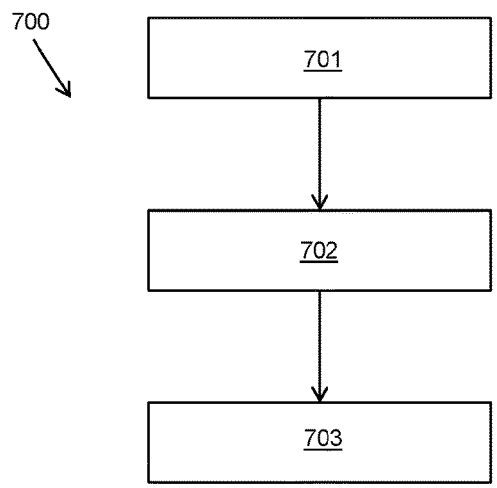
FIG. 6 illustrates a block flow diagram indicating a method of providing sensory feedback to a gesture.

FIG. 6 shows a method 700 of providing a sensory feedback to a user of a gesture recognition device, which may be used, for example with in a gesture recognition device such as device 100 or device 400. At step 701 of method 700, a gesture made by a user is detected with a gesture detector of the device. This may be achieved, for example, by transmitting electromagnetic radiation from an antenna of the device and detecting electromagnetic radiation that is reflected from the user. At step 702 the gesture is recognised by associating the detected gesture with known gestures using a gesture analysis block of the device. At step 703 a magnetic field is generated by a magnetic field generator of the device in response to recognising a particular gesture, in order to provide a magnetic force on a wearable magnetic tag worn by the user.

In the above examples, an array of antennae was used to detect the gesture and to generate a magnetic force. However, a gesture recognition device may comprise only one antenna, or may use the antennae only to generate a magnetic field. Gesture detection may be achieved by recording a gesture, for example with a digital camera, and analysing the recorded gesture with a gesture analysis block of the device.

In the above embodiments the gesture recognition device was shown as part of a separate device, such as a mobile phone. However, in any of these embodiments the gesture recognition device may also be worn by the user, and may form part of the same piece of wearable apparatus as the wearable tag. For example, both the wearable tag and the gesture recognition device may be part of a glove. A certain portion of the glove may comprise the gesture recognition device. The portion of the glove may for example be the palm of the glove, or one or more fingers of the glove. For example, in embodiments comprising a plurality of antennae, the plurality of antennae may be spread across the finger portions of the glove.

In any example of a gesture recognition device according to the present disclosure that comprises a magnetic field generator and a means to detect and transmit electromagnetic radiation, it may be necessary to separate the magnetic and electromagnetic signals to minimise interference between the signals. This may be achieved for example using time domain modulation, or field switching techniques.

From reading the present disclosure, other variations and modifications will be apparent to the skilled person. Such variations and modifications may involve equivalent and other features which are already known in the art of gesture recognition devices, and which may be used instead of, or in addition to, features already described herein.

Although the appended claims are directed to particular combinations of features, it should be understood that the scope of the disclosure of the present invention also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable sub-combination. The applicant hereby gives notice that new claims may be formulated to such features and/or combinations of such features during the prosecution of the present application or of any further application derived therefrom.

For the sake of completeness it is also stated that the term "comprising" does not exclude other elements or steps, the term "a" or "an" does not exclude a plurality, and reference signs in the claims shall not be construed as limiting the scope of the claims.

The invention claimed is:

1. A gesture recognition device for recognizing gestures made by a user, the device comprising:
    a gesture detector for detecting a gesture made by a user;
    a gesture analysis block comprising:
        a memory configured to store known gestures; and
        a pattern recognition block configured to associate a gesture detected by the gesture detector with a known gesture stored in the memory; and
    a magnetic field generator for interacting with a wearable tag, the magnetic field generator configured to provide a magnetic force on the wearable tag when a particular gesture is recognized by the gesture analysis block,
    wherein the gesture detector comprises an antenna or an array of antennae for transmitting and detecting electromagnetic radiation, and wherein the gesture detector is operable to detect electromagnetic radiation reflected from a user,
    wherein the magnetic field generator is configured to apply a DC current to the antenna or to at least one of the antenna from the array of antennae in order to generate a magnetic field.

2. The device of claim 1, wherein the antenna or at least one of the antenna from the array of antennae are operable to transmit and receive radio waves in a near field regime, and wherein the device further comprises a near field communication (NFC) reader configured to transmit and receive NFC signals using the antenna or the at least one of the antenna from the array of antennae.

3. The device of claim 1, wherein the gesture detector further comprises a digital camera.

4. The device of claim 1, wherein the magnetic field generator comprises a permanent magnet.

5. The device of claim 1, wherein the device is operable to separate transmission of electromagnetic radiation from generation of the magnetic field using time-domain multiplexing or field switching.

6. A gesture recognition system comprising:
    the wearable tag suitable to be worn by the user of the system; and
    the gesture recognition device according to claim 1.

7. The system of claim 6, wherein the wearable tag comprises a permanent magnet.

8. The system of claim 6, wherein the wearable tag comprises an electromagnet, and wherein the system further comprises a power source operable to power the electromagnet.

9. The system of claim 6, wherein the wearable tag comprises an antenna and a microprocessor configured to communicate with the gesture recognition device using NFC signals.

10. A method of providing a sensory feedback to a user of a gesture recognition device, the method comprising:
    detecting a gesture made by a user with a gesture detector of the device, wherein the step of detecting a gesture made by the user comprises:
        transmitting electromagnetic radiation from an antenna of the device, and
        detecting electromagnetic radiation that is reflected from the user;
    recognizing the gesture by associating the detected gesture with known gestures using a gesture analysis block of the device;
    generating a magnetic field with a magnetic field generator of the device in response to recognizing a particular gesture, in order to provide a magnetic force on a wearable magnetic tag worn by the user,
    wherein the steps of transmitting electromagnetic radiation and generating the magnetic field are separated using time domain multiplexing or field switching techniques.

11. A gesture recognition system comprising:
    a wearable tag suitable to be worn by a user of the system; and
    a gesture recognition device for recognizing gestures made by the user, the device comprising:
        a gesture detector for detecting a gesture made by the user;
        a gesture analysis block comprising:
            a memory configured to store known gestures; and a pattern recognition block configured to associate a gesture detected by the gesture detector with a known gesture stored in the memory; and a magnetic field generator for interacting with the wearable tag, the magnetic field generator configured to provide a magnetic force on the wearable tag when a particular gesture is recognized by the gesture analysis block, wherein the wearable tag comprises an electromagnet, and wherein the system further comprises a power source operable to power the electromagnet.

\* \* \* \* \*